(12) United States Patent
Wehrmann

(10) Patent No.: US 7,975,457 B2
(45) Date of Patent: *Jul. 12, 2011

(54) APPARATUS FOR MAKING FLUID FILLED UNITS

(75) Inventor: Rick Steven Wehrmann, Hudson, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,158

(22) Filed: Apr. 12, 2010

(65) Prior Publication Data

US 2010/0192526 A1    Aug. 5, 2010

Related U.S. Application Data

(63) Continuation of application No. 12/394,333, filed on Feb. 27, 2009, now Pat. No. 7,694,495, which is a continuation of application No. 11/484,050, filed on Jul. 11, 2006, now Pat. No. 7,513,090.

(51) Int. Cl.
*B65B 9/06* (2006.01)

(52) U.S. Cl. ................. 53/550; 53/562; 53/403

(58) Field of Classification Search ............ 53/384.1, 53/403, 432, 473, 434, 550, 562, 173, 370.7, 53/371.3, 372.3, 372.4, 373.5, 373.7, 374.3, 53/375.3; 156/145, 147, 272, 210, 285, 292, 156/494, 499, 553

See application file for complete search history.

(56) References Cited

U.S. PATENT DOCUMENTS

| | | |
|---|---|---|
| 3,254,820 A | 6/1966 | Lerner |
| 3,254,828 A | 6/1966 | Lerner |
| 3,298,156 A | 1/1967 | Lerner |
| 3,367,261 A | 2/1968 | Kashiwagi |

(Continued)

FOREIGN PATENT DOCUMENTS

WO    00/71423    11/2000

OTHER PUBLICATIONS

Office action from U.S. Appl. No. 11/484,050 dated Jun. 12, 2008.

(Continued)

*Primary Examiner* — Hemant M Desai
(74) *Attorney, Agent, or Firm* — Calfee Halter & Griswold LLP

(57) ABSTRACT

The present invention concerns a machine and a method for converting a web of preformed pouches to dunnage units. In one exemplary embodiment the machine includes a drive, a blower, and a sealing mechanism. The drive is arranged to move the web of preformed pouches along a path of travel through the machine. The blower is positioned with respect to the path of travel, to inflate the preformed pouches. The sealing mechanism includes a heating element support and a heating element. The heating element support includes a sealing side and a belt preheating side. The heating element is disposed around at least a portion of the heating side and at least a portion of the belt preheating side. The drive includes a belt that is disposed around the heating element. The sealing mechanism is positioned with respect to the path of travel, to provide seals to the pouches to form inflated dunnage units. The heating element support is configured to maintain the heating element in contact with the heating element support preheating side.

10 Claims, 7 Drawing Sheets

U.S. PATENT DOCUMENTS

| | | |
|---|---|---|
| 3,414,140 A | 12/1968 | Feldkamp |
| 3,462,027 A | 8/1969 | Puckhaber |
| 3,477,196 A | 11/1969 | Lerner |
| 3,523,055 A | 8/1970 | Lemelson |
| 3,575,757 A | 4/1971 | Smith |
| 3,575,781 A | 4/1971 | Pezely |
| 3,577,305 A | 5/1971 | Hines et al. |
| 3,616,155 A | 10/1971 | Chavannes |
| 3,650,877 A | 3/1972 | Johnson |
| 3,730,240 A | 5/1973 | Presnick |
| 3,791,573 A | 2/1974 | Titchenal et al. |
| 3,808,981 A | 5/1974 | Shaw |
| 3,817,803 A | 6/1974 | Horsley |
| 3,837,990 A | 9/1974 | McConnell et al. |
| 3,837,991 A | 9/1974 | Evans |
| 3,938,298 A | 2/1976 | Luhman et al. |
| 3,939,995 A | 2/1976 | Baxter |
| 4,014,154 A | 3/1977 | Lerner |
| 4,017,351 A | 4/1977 | Larson et al. |
| 4,040,526 A | 8/1977 | Baxter et al. |
| 4,044,693 A | 8/1977 | Ramsey, Jr. |
| 4,076,872 A | 2/1978 | Lewicki et al. |
| 4,096,306 A | 6/1978 | Larson |
| 4,102,364 A | 7/1978 | Lowdermilk |
| 4,103,471 A | 8/1978 | Lowdermilk |
| 4,146,069 A | 3/1979 | Angarola et al. |
| 4,201,029 A | 5/1980 | Lerner |
| 4,306,646 A | 12/1981 | Dahlem |
| 4,314,865 A | 2/1982 | Ottaviano |
| 4,354,004 A | 10/1982 | Hughes et al. |
| 4,518,654 A | 5/1985 | Eichbauer et al. |
| 4,564,407 A | 1/1986 | Tsuruta |
| 4,576,669 A | 3/1986 | Caputo |
| 4,597,244 A | 7/1986 | Pharo |
| 4,619,635 A | 10/1986 | Ottaviano |
| 4,676,376 A | 6/1987 | Keiswetter |
| 4,793,123 A | 12/1988 | Pharo |
| 4,847,126 A | 7/1989 | Yamashiro et al. |
| 4,874,093 A | 10/1989 | Pharo |
| 4,904,092 A | 2/1990 | Campbell et al. |
| 4,918,904 A | 4/1990 | Pharo |
| 4,922,687 A | 5/1990 | Chow et al. |
| 4,931,033 A | 6/1990 | Leeds |
| 5,117,608 A | 6/1992 | Nease et al. |
| 5,141,494 A | 8/1992 | Danforth et al. |
| 5,181,614 A | 1/1993 | Watts |
| 5,188,691 A | 2/1993 | Caputo |
| 5,203,761 A | 4/1993 | Reichental et al. |
| 5,216,868 A | 6/1993 | Cooper et al. |
| 5,257,492 A | 11/1993 | Watts |
| 5,272,856 A | 12/1993 | Pharo |
| 5,289,671 A | 3/1994 | Lerner |
| 5,351,828 A | 10/1994 | Becker et al. |
| 5,383,837 A | 1/1995 | Watts |
| 5,394,676 A | 3/1995 | Lerner |
| 5,468,525 A | 11/1995 | Watts |
| 5,470,300 A | 11/1995 | Terranova |
| 5,552,003 A | 9/1996 | Hoover et al. |
| 5,693,163 A | 12/1997 | Hoover et al. |
| 5,858,163 A | 1/1999 | Mack |
| RE36,501 E | 1/2000 | Hoover et al. |
| 6,015,357 A | 1/2000 | Ricci |
| RE36,759 E | 7/2000 | Hoover et al. |
| 6,199,349 B1 | 3/2001 | Lerner |
| 6,209,286 B1 | 4/2001 | Perkins et al. |
| 6,481,188 B1 * | 11/2002 | Graham et al. ........... 53/479 |
| 6,519,916 B1 | 2/2003 | Brown |
| 6,526,728 B1 * | 3/2003 | Sorenson et al. ........... 53/450 |
| 6,527,147 B2 | 3/2003 | Wehrmann |
| 6,582,800 B2 | 6/2003 | Fuss et al. |
| 6,604,340 B2 * | 8/2003 | Liao ........................ 53/373.7 |
| 6,625,956 B1 | 9/2003 | Soudan |
| 6,659,150 B1 | 12/2003 | Perkins et al. |
| 6,672,037 B2 | 1/2004 | Wehrmann |
| 6,786,022 B2 | 9/2004 | Fuss et al. |
| 7,513,090 B2 | 4/2009 | Wehrmann |
| 7,694,495 B2 | 4/2010 | Wehrmann |
| 2006/0090421 A1 | 5/2006 | Sperry et al. |
| 2008/0022630 A1 | 1/2008 | Fuss et al. |

OTHER PUBLICATIONS

Amendment from U.S. Appl. No. 11/484,050 dated Nov. 10, 2008.
Notice of Allowance from U.S. Appl. No. 11/484,050 dated Dec. 16, 2008.
Office action from U.S. Appl. No. 12/394,333 dated May 27, 2009.
Amendment from U.S. Appl. No. 12/394,333 dated Oct. 26, 2009.
Notice of Allowance from U.S. Appl. No. 12/394,333 dated Dec. 2, 2009.

* cited by examiner

APPARATUS FOR MAKING FLUID FILLED UNITS

RELATED APPLICATIONS

This application is a continuation application of U.S. Ser. No. 12/394,333 filed on Feb. 27, 2009 for APPARATUS AND METHOD FOR MAKING FLUID FILLED UNITS which is a continuation of U.S. patent application Ser. No. 11/484,050 filed on Jul. 11, 2006, now U.S. Pat. No. 7,513,090, for APPARATUS AND METHOD FOR MAKING FLUID FILLED UNITS, the entire disclosure of which is fully incorporated herein by reference.

FIELD OF THE INVENTION

The present application relates to apparatus and methods for filling fluid filled units.

BACKGROUND

Machines for forming and filling dunnage units from sheets of plastic are known. Machines which produce dunnage units by inflating preformed pouches in a preformed web are also known. For many applications, machines which utilize preformed webs are preferred.

SUMMARY

The present invention concerns a machine and a method for converting a web of preformed pouches to dunnage units. In one exemplary embodiment the machine includes a drive, a blower, and a sealing mechanism. The drive is arranged to move the web of preformed pouches along a path of travel through the machine. The blower is positioned with respect to the path of travel, to inflate the preformed pouches. The sealing mechanism includes a heating element support and a heating element. The heating element support includes a sealing side and a belt preheating side. The heating element is disposed around at least a portion of the heating side and at least a portion of the belt preheating side. The drive includes a belt that is disposed around the heating element. The sealing mechanism is positioned with respect to the path of travel, to provide seals to the pouches to form inflated dunnage units. The heating element support is configured to maintain the heating element in contact with the heating element support preheating side.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to illustrate the principles of this invention. The drawings and detailed description are not intended to and do not limit the scope of the invention or the claims in any way. Instead, the drawings and detailed description only describe embodiments of the invention and other embodiments of the invention not described are encompassed by the claims.

DETAILED DESCRIPTION

The Detailed Description merely describes preferred embodiments of the invention and is not intended to limit the scope of the claims in any way. Indeed, the invention as described by the claims and the specification is broader than and unlimited by the preferred embodiments, and the terms in the claims and specification have their full ordinary meaning.

The present invention concerns machines and methods of using such machines for converting a web of preformed pouches to dunnage units. Examples of webs of preformed pouches that can be converted to dunnage units by machines in accordance with the present invention are shown and described in U.S. patent application Ser. No. 11/141,304 to Wehrmann, filed May 31, 2005, and U.S. patent application Ser. No. 11/194,375 to Wehrmann, filed Aug. 1, 2005, both of which are hereby incorporated in their entirety. It should be readily apparent that other preformed webs, in addition to those disclosed in the above-referenced patent applications, may be used in the machines disclosed herein to produce dunnage units.

Figure 2:
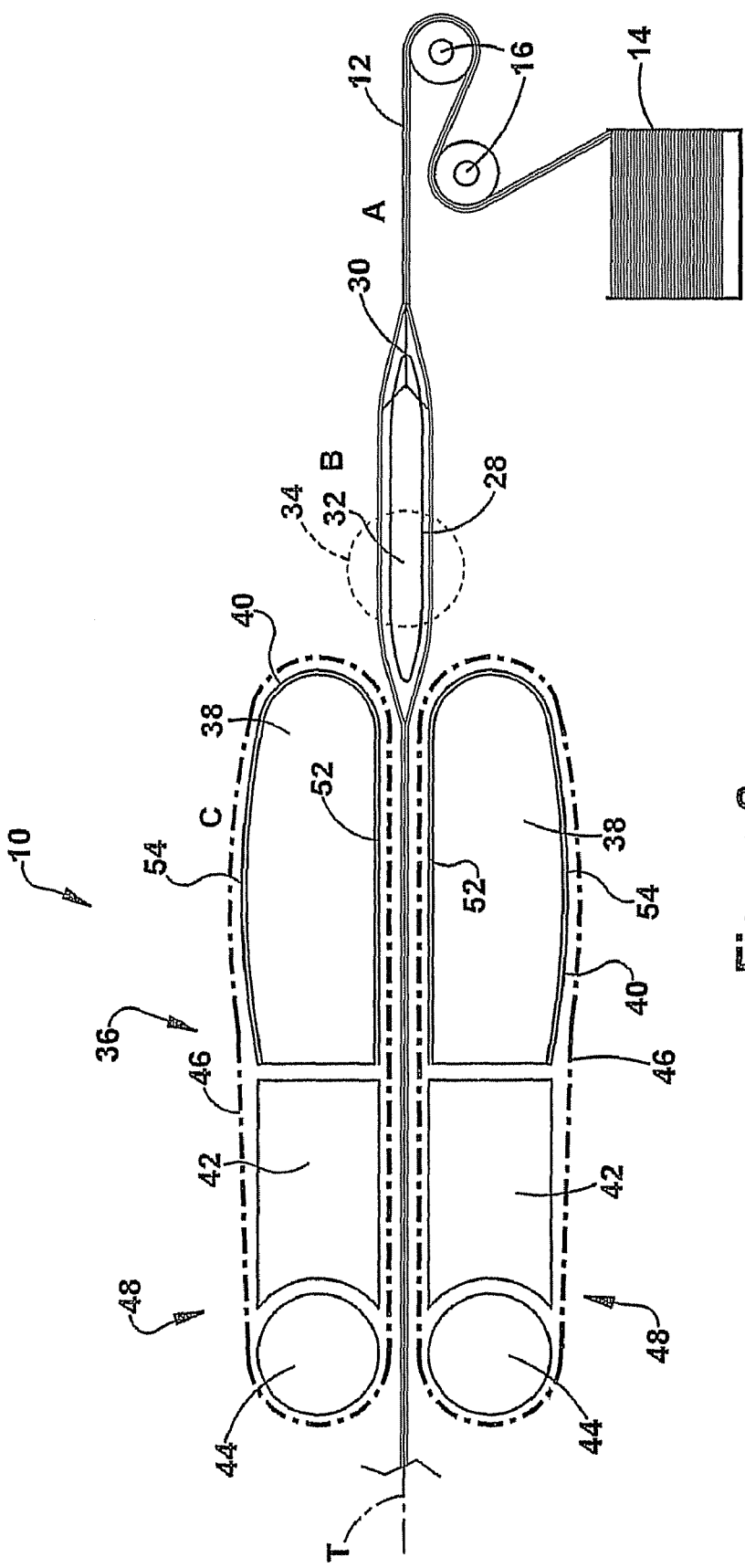
FIG. 2 schematically illustrates an elevational view of an exemplary machine in accordance with the present invention for converting a web of preformed pouches to fluid filled units.
Figure 2A:
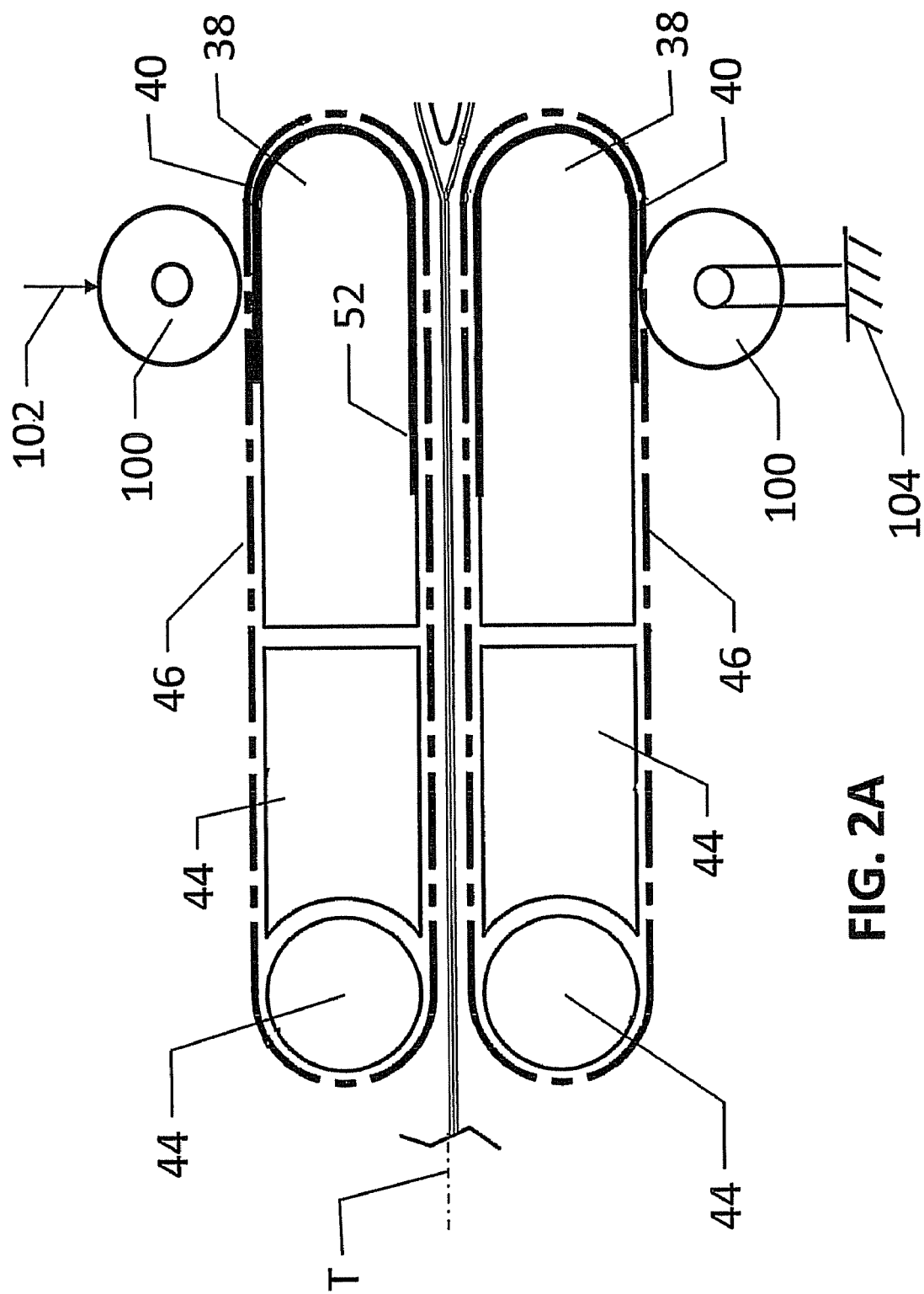
FIG. 2A schematically illustrates an elevational view of a second embodiment of a machine in accordance with the present invention for converting a web of preformed pouches to fluid filled units.
Figure 2B:
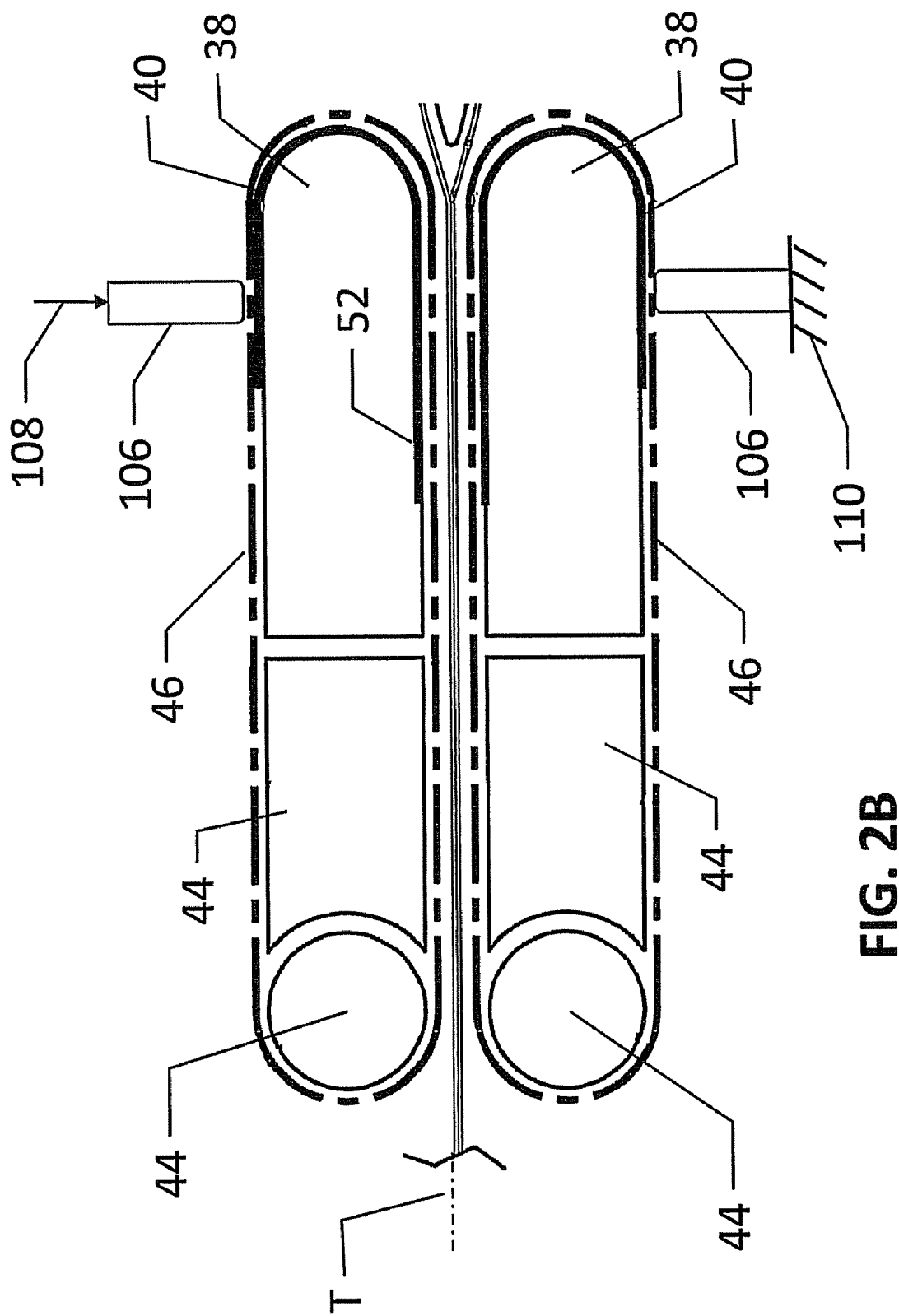
FIG. 2B schematically illustrates an elevational view of a third embodiment of a machine in accordance with the present invention for converting a web of preformed pouches to fluid filled units.
Figure 2C:
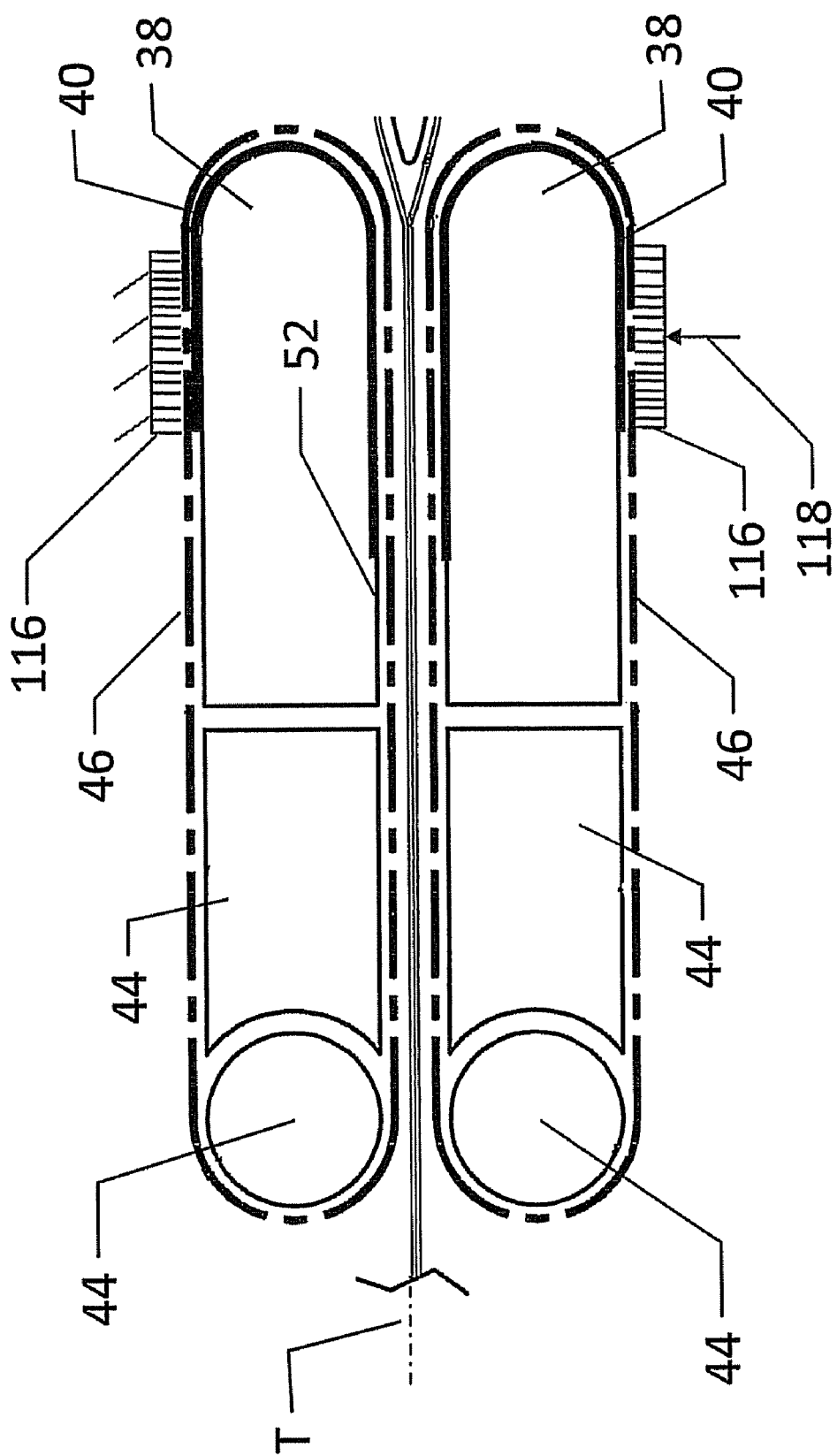
FIG. 2C schematically illustrates an elevational view of a fourth embodiment of a machine in accordance with the present invention for converting a web of preformed pouches to fluid filled units.
Figure 3:
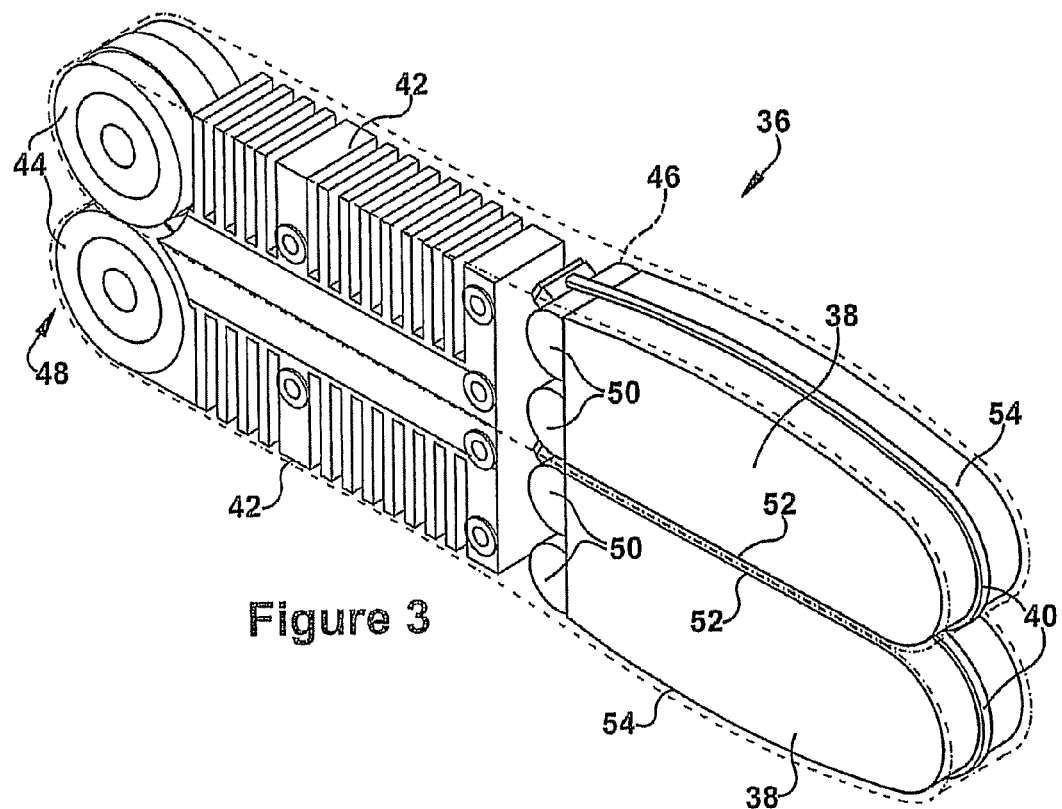
FIG. 3 illustrates a perspective view of an exemplary sealing mechanism in accordance with the present invention for sealing inflated pouches, in which a drive belt is shown in phantom lines.

Referring to FIGS. 2 and 3, one embodiment of the present invention is a machine 10 for converting a web 12 of performed pouches to dunnage units, with a heating element support 38 that maintains a heating element 40 in contact with a preheating side 54 of the heating element support 38. In the example illustrated by FIG. 3, the preheating side 54 is contoured to keep the heating element 40 in contact with the heating element support 38. The heating element 40 may be kept in contact with the heating element support in a wide variety of other ways. For example, an automatic tensioning member, such as a spring or a manual tensioning member, such as a threaded fastener may press or pull the heating element 40 against the heating element support 38. The heating element 40 can be molded into the heating element support 38. The heating element 40 can be glued to the heating element support. In the embodiment illustrated by FIG. 2A, a roller 100 presses the heating element 40 into contact with the preheating side 54 of the heating element support 38. The roller 100 may be biased into engagement with the belt 46 with a spring or other biasing member as indicated by arrow 102 or the position of the roller 100 may be fixed with respect to the heating element support 38 by a roller support 104. In the embodiment illustrated by FIG. 2B, a finger or extension member 106 presses the heating element 40 into contact with the preheating side 54 of the heating element support 38. The extension member 106 may be biased into engagement with the belt 46 with a spring or other biasing member as indicated by arrow 108 or the position of the extension member 106 may be fixed with respect to the heating element support 38 by a support 110. In the embodiment illustrated by FIG. 2C, a brush 116 presses the heating element 40 into contact with the preheating side 54 of the heating element support 38. The brush 116 may be biased into engagement with the belt 46 with a spring or other biasing member as indicated by arrow 118 or the position of the brush 116 may be fixed with respect to the heating element support 38 by a support 118.

Figure 1:
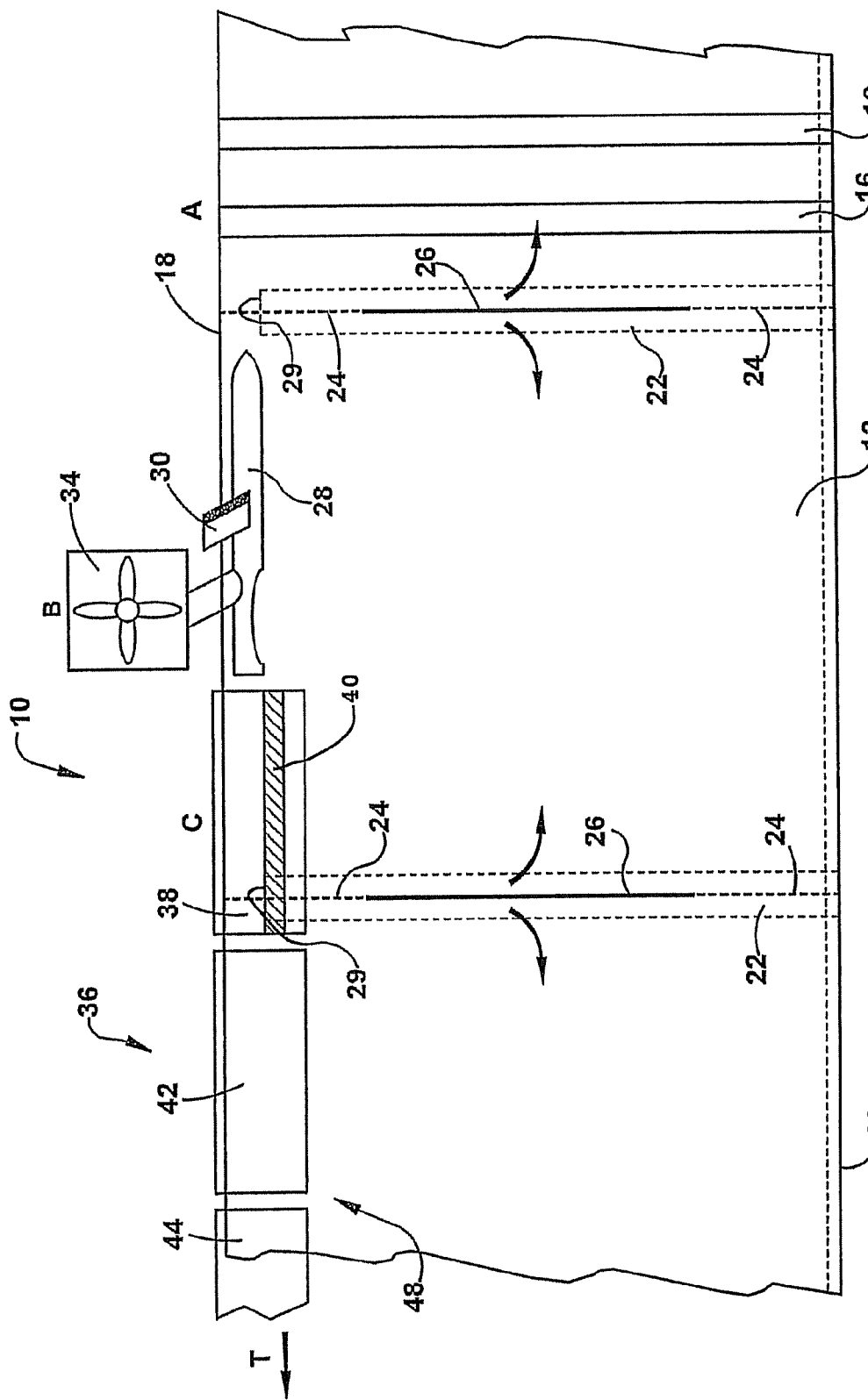
FIG. 1 schematically illustrates a plan view of an exemplary machine in accordance with the present invention for converting a web of preformed pouches to fluid filled units.

FIGS. 1 and 2 schematically illustrate an example of a machine 10 and process for converting webs 12 of preformed pouches to dunnage units that may include a heating element support 38 that maintains the heating element 40 in contact with the heating element support. A heating element support 38 that maintains the heating element 40 in contact with the heating element support can be implemented on a wide variety of other machines for producing dunnage units from preformed webs. An exemplary web 12 is routed from a supply 14 (shown in FIG. 2) to and around a pair of elongated, transversely extending guide rollers 16. The guide rollers 16 keep the web 12 taught as the web 12 is pulled through the machine 10. The web 12 includes a top elongated layer of plastic superimposed onto a bottom layer of plastic. Referring to FIG. 1, the layers are connected along spaced edges, referred to as the inflation edge 18 and the opposite edge 20. In addition, a plurality of longitudinally spaced, transverse seals 22 join the top and bottom layers. Generally, each transverse seal 22 extends from the opposite edge 20 to within a short distance of the inflation edge 18. Spaced pairs of lines of perforations 24 extend through the top and bottom layers terminating a short distance from the edges 18 and 20. In one embodiment, the web includes gap forming area 26 that extends between each associated pair of lines of perforations 24. The gap forming area 26 can serve to reduce stresses and other unwanted forces on the pouches while the pouches are inflated. In other embodiments, the gap forming area 26 is not included. For example uniform perforations 24 may extend from one side of the web to the other side of the web in a uniform manner.

Referring again to FIGS. 1 and 2, at location A of the machine 10, the web of pouches are uninflated. As the web 12 moves through the machine 10, along a path of travel T, a longitudinally extending guide pin 28 is disposed in the web 12 at station B. The guide pin 28 is disposed in a pocket bounded by the top and bottom layers of plastic, the inflation edge 18, and the ends 29 of the transverse seals 22, located proximate to the inflation edge 18. The guide pin 28 aligns the web 12 as the web 12 is pulled along the path of travel T through the machine 10. A cutter 30 extends from the guide pin 28 and is used to cut the inflation edge 18 of the web 12. The cutter 30 slits the inflation edge 18 as the web 12 moves through the machine 10 to provide inflation openings 32 (See FIG. 2) into the pouches.

A blower 34 is positioned after the cutter 30 at station B of the machine 10 and inflates the preformed pouches as the web 12 moves past the blower 34. A sealing mechanism or assembly 36 is positioned at station C of the machine 10 to form a seal to close the pouches and complete the dunnage units. In the illustrated embodiment, the sealing assembly 36 includes a pair of heating element supports 38, a pair of heating elements 40, a pair of cooling elements 42. A drive 48 includes a pair of drive rollers 44 that are driven by one or more motors 45, and a pair of drive belts 46 (shown in FIG. 2) that are driven by the rollers 44. The drive 48 moves the web 12 along the path of travel T through the machine 10. The illustrated drive 48 can be replaced by any drive that can move the web along the path of travel. In an alternate embodiment, the pair of cooling elements 42 are omitted.

Figure 4:
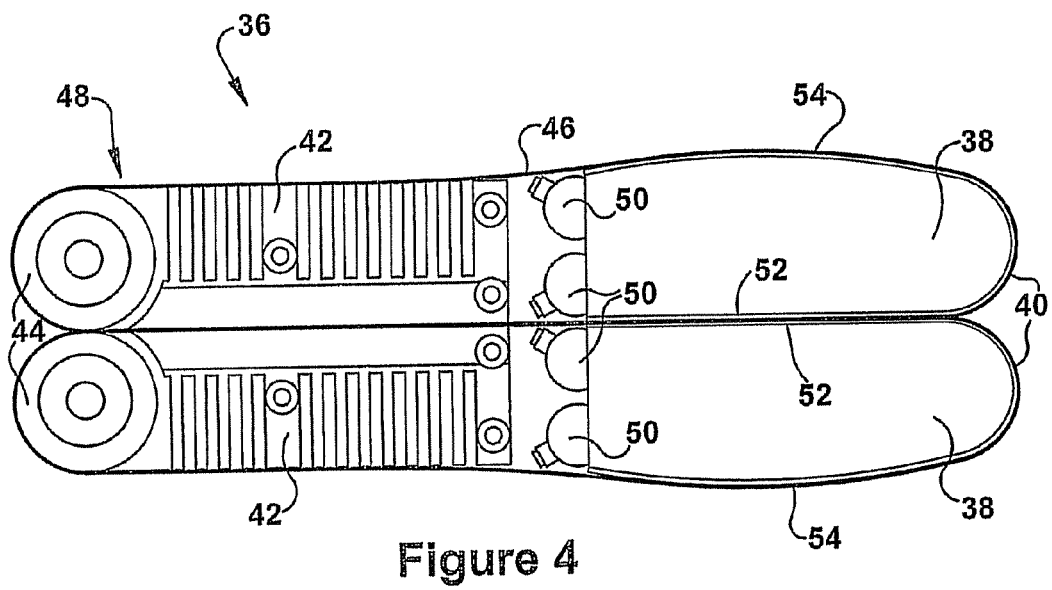
FIG. 4 illustrates an elevational view of the exemplary sealing mechanism of FIG. 3.

As best seen in FIGS. 3 and 4, an example of a suitable heating element support 38 is a block formed or fabricated from an insulating material and structurally capable of supporting a heating element 40. Examples of suitable materials for the heating element support include Teflon, ceramics, plastic materials and a wide variety of other materials. An example of a suitable heating elements 40 is a heating wire made of an electrically conductive material. Resistance in such a wire causes the heating wire to heat up when a voltage is applied to the wire. The illustrated drive 48 may be replaced by any drive that can move the web along the path of travel.

In the exemplary embodiment, each heating element is disposed around one of the heating element supports The heating elements are secured to their heating element supports 38 by attachment members 50. In the embodiment illustrated by FIGS. 3 and 4, attachment members 50 are posts. However, the attachment members 50 may be any mechanism for mechanically attaching the heating elements to the insulation blocks that allows a voltage to be applied to the heating element. The heating elements 40 are secured to the posts 50 such that the machine 10 can selectively apply voltage to the wires 40 to heat the wires 40. The voltage is applied to the wires 40 such that the wires 40 reach a generally consistent operating temperature that is effective in sealing an inflated pouch to form a dunnage unit.

In the illustrated embodiment, each drive belt 46 is a loop of material that is disposed around its respective drive roller 44, insulation block 38, and cooling element 42, if included. The drive belts can be made from a wide variety of different materials. For example, the drive belts can be made from Teflon impregnated fiberglass cloth. As best seen in FIG. 4, the drive belt 46 is also disposed around the heating element 40 such that the heating element is 40 positioned between the drive belt 46 and the heating element support 38.

The drive belts 46 are driven by the drive rollers 44 and moves along a generally oval path about the heating element support 38, cooling element 42, and drive roller 44. As best seen in FIGS. 2 and 3, the pair of drive belts 46 contact and engage one another along the path of travel T of the web 12 through the machine 10. This contact and engagement causes the drive belts 46 to grasp the web 12 and pull the web 12 through the machine 10, first past the heating wires 40 and then, optionally, past the cooling elements 42.

A seal is formed between the top layer and bottom layer of each pouch when the layers are exposed to heat from the heating element 40. The seal is positioned to intersect with the transverse seals 22. This heat, applied to the top and bottom layers of plastic, causes the plastic to become molten and flow, such that portions of the plastic proximate to the heat source merged. As this area cools, a sealed area is formed to close a pouch. The cooling process can be accelerated by the extraction of heat from the sealed area of the pouch. This accelerated cooling can be accomplished by moving the web 12 to position the sealed area proximate to the cooling element 42. The cooling element 42 may be formed or fabricated from any suitable heatsink material, which transfers heat away from the sealed area. One example of such a material is aluminum.

Quality and consistency of seals is ensured by ensuring that the temperature of the heating element 40 is maintained at an intended sealing temperature. For example, the temperature of a wire heating element may be maintained at between 200-400 degrees Fahrenheit. The temperature of a heating element 40 is a function of the voltage applied to the heating element 40 and the environment the heating element 40 operates in (i.e., the medium that dissipates heat from the wire). The voltage applied to the heating element 40 determines how much heat is generated by the heating element 40 and the environment the heating element 40 is operated in determines how rapidly heat dissipates from the heating element 40. If the operating conditions vary along the length of the heating element 40, then the temperature of the heating element 40 may differ at discrete locations along the length of the heating element 40. This disparity in temperatures along the heating element 40 can cause one section or portion of heating element 40 to increase in temperature. For example, if one portion of the wire does not contact the heating element support 38, that portion may become significantly hotter than other portions of the wire.

Each heating element support 38, which is an insulation block in the illustrated embodiment has a sealing side 52 and a belt preheating side 54. The sealing side 52 of the heating element support 38 is along the path of travel T, where the drive belts 46 are in contact with one another. The belt preheating side 54 is on the opposite side of the heating element support 38. The belt preheating side 54 serves to heat the drive belts 46 as the belt 46 passes to preheat the belt and enhance the transfer heat through the belt 46 to the pouches that are sealed along the sealing side 52 of the heating element support 38.

The portion of the heating element 40 along the sealing side 52 is clamped between each pair of heating element supports 38 to ensure that the pair of drive belts 46 are in contact and engaged. This clamping keeps the portion of heating element 40 along the sealing side 52 in contact with both the heating element support 38 and the drive belt 46. On the belt preheating side 54, there is no clamping force to ensure that the heating element 40 stays in contact with both the drive belt 46 and the heating element support 38 in the illustrated embodiment. Because the heating element support dissipates heat, if the heating element 40 is not in contact with the heating element support 38, the temperature along that portion of wire 40 will differ from the temperature of the portion of heating element disposed 40 along the sealing side 52. For example, the heating element on the preheating side could become too hot and/or make the belt too hot.

Figure 5:
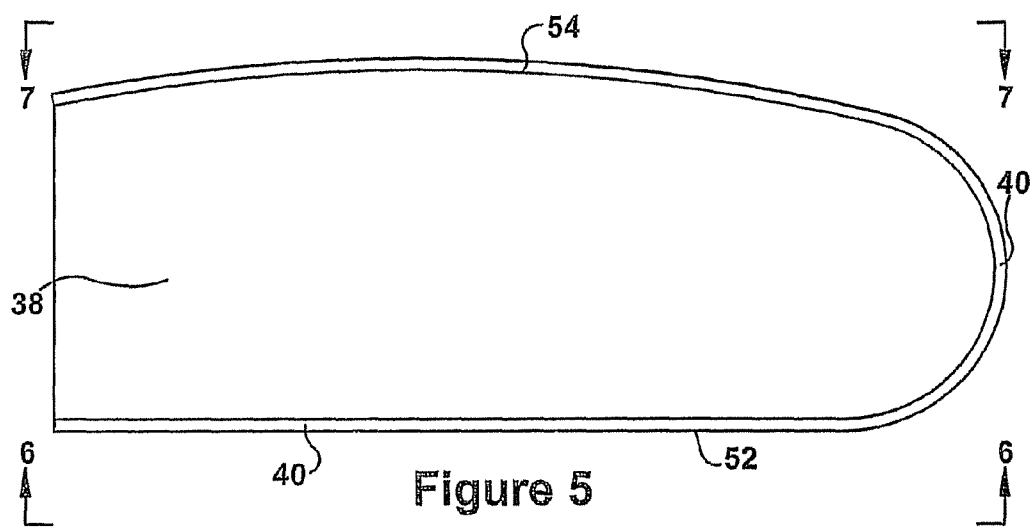
FIG. 5 schematically illustrates an elevational view of an exemplary heating element support and heating element in accordance with the present invention.
Figure 6:
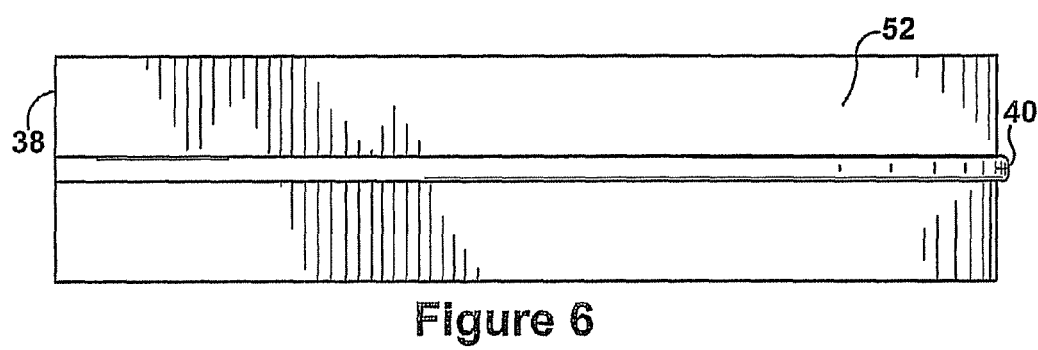
FIG. 6 schematically illustrates a bottom view of the heating element support and heating element of FIG. 5.
Figure 7:
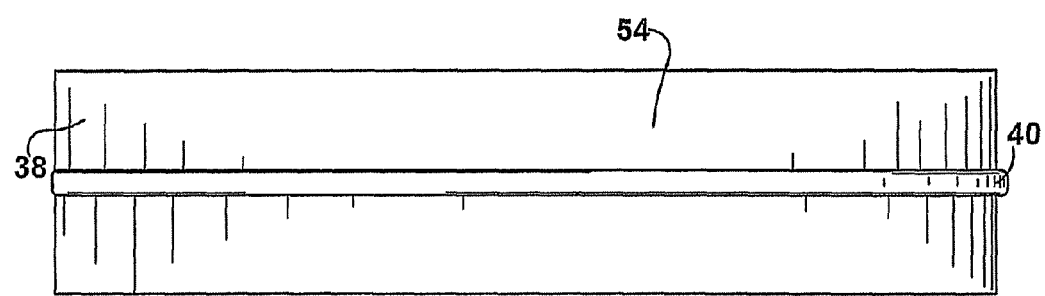
FIG. 7 schematically illustrates a top view of the heating element support and heating element of FIG. 5.

The shape and contour of the belt preheating side 54 may be designed such that the portion of the heating element 40 along the belt preheating side 54 of the heating element support 38 stays in contact with the heating element support 38. In one embodiment, the shape of the heating element support also causes the heating element 38 to stay in contact with the belt 46. As is shown in FIGS. 3, 4, and 5, the belt preheating side 54 of the heating element support 38 can be fabricated to be generally curved, convex, or arcuate. As best seen in FIG. 4, a convex, generally curved shape maintains the heating element 40 in contact with the belt 46 and the heating element support 38 along the entire belt preheating side 54.

Although the heating element has been shown and described as a heating wire disposed along the sealing and belt preheating sides of an insulation block, it should be understood that a heating element in accordance with the present invention can take an a variety of embodiments and be disposed in a variety of arrangements. For example, a heating element may be a band of material or a plurality of discretely dispersed material. In addition, a heating element may be disposed only around a portion of the sealing side or the a portion of the belt preheating side. The heating element support is illustrated as an insulation block is having a curved, convex, or arcuate belt preheating side. The heating element support may be made from any material and may be in any shape and/or configuration that supports a heating element such that the heating element does not overheat.

While various aspects of the invention are described and illustrated herein as embodied in combination in the exemplary embodiments, these various aspects may be realized in many alternative embodiments not shown, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however; such values and ranges are not to be construed in a limiting sense and are intended to be critical values or ranges only if so expressly stated.

I claim:

1. A machine for converting a web of preformed pouches to dunnage units, the machine comprising:
    a drive including at least one motor and at least one belt for moving the web along a path of travel;
    a blower positioned with respect to the path of travel for inflating the preformed pouches; and
    a sealing mechanism positioned with respect to the path of travel to provide seals to the pouches to form inflated dunnage units, the sealing mechanism comprising:
    a heating element support block having a sealing side and a belt preheating side that is a side of the heating element support block that is opposite the sealing side;
    a heating element having a portion disposed along the sealing side and a portion disposed along the belt preheating side;
    the belt is disposed around the heating element and driven by the motor;
    wherein the portion of the heating element disposed along the sealing side is clamped against the sealing side;
    wherein the portion of the heating element disposed along the belt preheating side is pressed against the preheating side to maintain the portion of the heating element along the belt preheating side in contact with the heating element support block preheating side.

2. The machine of claim 1 wherein heating element is pressed against the preheating side with a roller.

3. The machine of claim 1 wherein heating element is pressed against the preheating side with an extension member.

4. The machine of claim 1 wherein heating element is pressed against the preheating side with a brush.

5. The machine of claim 1 wherein the heating element support block is made from an insulating material.

6. The machine of claim 1 further comprising a second sealing mechanism and wherein the web is clamped between the two sealing mechanisms.

7. The machine of claim 1 wherein the pouches are defined by transverse seals that extend from a remote edge to within a predetermined distance of an inflation edge.

8. The machine of claim 7 wherein the seal is longitudinal with respect to the path of travel and intersects the transverse seals to close the preformed pouches.

9. The machine of claim 1 further comprising a cooling element positioned to cool the seal formed by the sealing mechanism.

10. The machine of claim 9 wherein the cooling element is a heat dissipating block that transfers heat away from the seal.

* * * * *